United States Patent
Horiuchi et al.

(10) Patent No.: US 11,251,442 B2
(45) Date of Patent: **\*Feb. 15, 2022**

(54) FUEL CELL SYSTEM

(71) Applicant: HONDA MOTOR CO., LTD., Tokyo (JP)

(72) Inventors: Yuhei Horiuchi, Wako (JP); Koichi Kimura, Wako (JP)

(73) Assignee: HONDA MOTOR CO., LTD., Tokyo (JP)

(\*) Notice: Subject to any disclaimer, the term of this patent is extended or adjusted under 35 U.S.C. 154(b) by 267 days.

This patent is subject to a terminal disclaimer.

(21) Appl. No.: 16/543,731

(22) Filed: Aug. 19, 2019

(65) Prior Publication Data

US 2020/0067110 A1 Feb. 27, 2020

(30) Foreign Application Priority Data

Aug. 23, 2018 (JP) .............................. JP2018-155930

(51) Int. Cl.
| | |
|---|---|
| *H01M 8/04089* | (2016.01) |
| *H01M 8/0662* | (2016.01) |
| *H01M 8/08* | (2016.01) |
| *H01M 8/04014* | (2016.01) |
| *H01M 8/04223* | (2016.01) |

(52) U.S. Cl.
CPC ..... *H01M 8/04089* (2013.01); *H01M 8/0662* (2013.01); *H01M 8/08* (2013.01); *H01M 8/04014* (2013.01); *H01M 8/04223* (2013.01)

(58) Field of Classification Search
CPC .. H01M 8/04089; H01M 8/0662; H01M 8/08; H01M 8/04014
See application file for complete search history.

(56) References Cited

U.S. PATENT DOCUMENTS

| | | | |
|---|---|---|---|
| 10,693,157 B2* | 6/2020 | Lucas | H01M 8/04149 |
| 2001/0021467 A1* | 9/2001 | Suzuki | H01M 8/04119 |
| | | | 429/413 |
| 2002/0039674 A1* | 4/2002 | Suzuki | H01M 8/04119 |
| | | | 429/414 |
| 2006/0147774 A1 | 7/2006 | Suzuki et al. | |
| 2013/0209902 A1* | 8/2013 | Mazzotta | H01M 8/04097 |
| | | | 429/410 |
| 2019/0071959 A1* | 3/2019 | Lourenco | H01M 8/0668 |
| 2020/0067111 A1* | 2/2020 | Horiuchi | H01M 8/04141 |

FOREIGN PATENT DOCUMENTS

JP 2006-147484 6/2006

\* cited by examiner

*Primary Examiner* — Matthew J Merkling
(74) *Attorney, Agent, or Firm* — Amin, Turocy & Watson, LLP

(57) ABSTRACT

A fuel cell system includes a gas liquid separator provided downstream of a humidifier in an oxygen-containing gas inlet channel, a fuel exhaust gas inlet channel for guiding a fuel exhaust gas containing liquid water discharged from a fuel cell stack to the gas liquid separator. The gas liquid separator performs gas liquid separation of both of an oxygen-containing gas humidified by the humidifier and the fuel exhaust gas containing the liquid water guided from the fuel exhaust gas inlet channel.

17 Claims, 7 Drawing Sheets

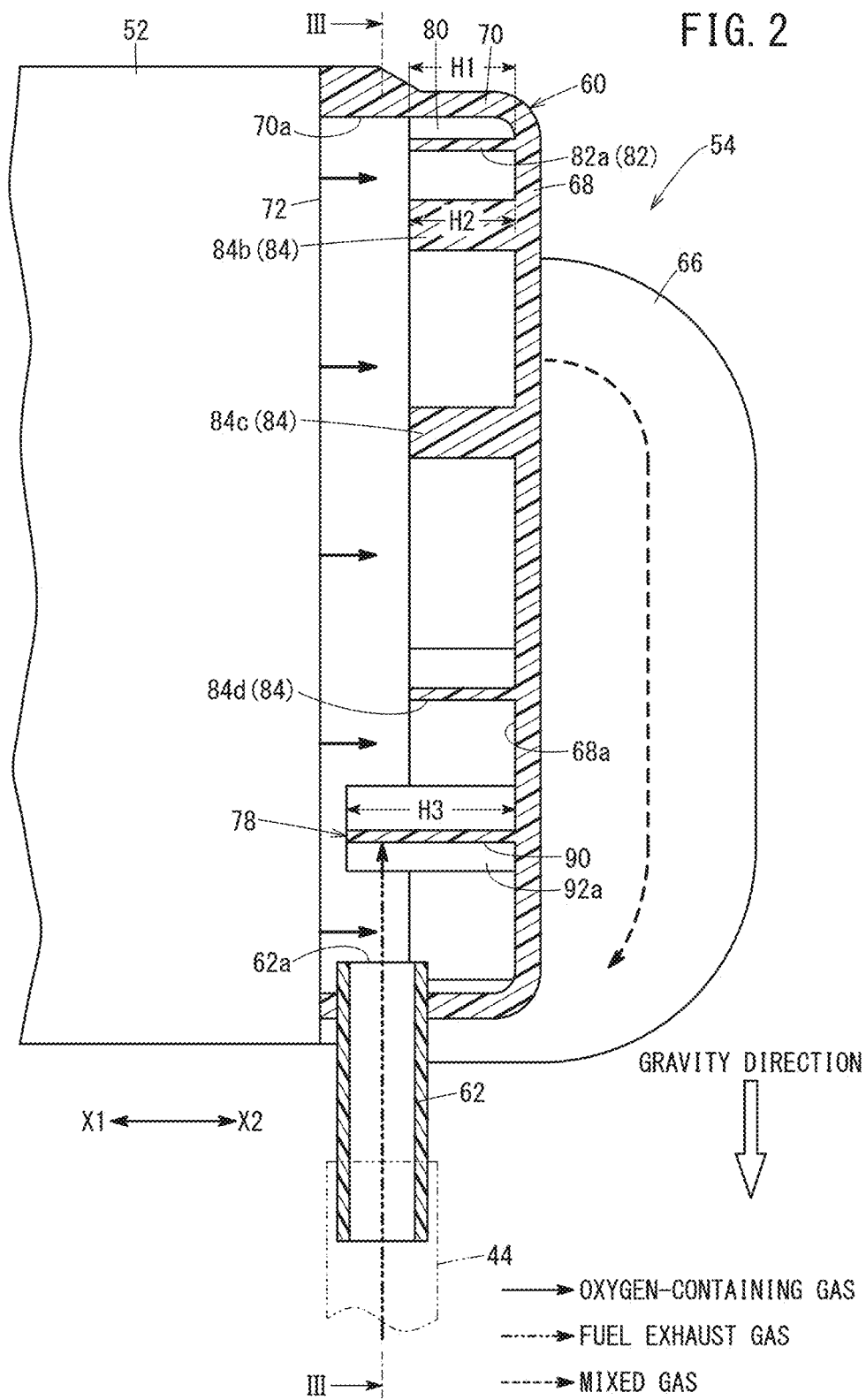

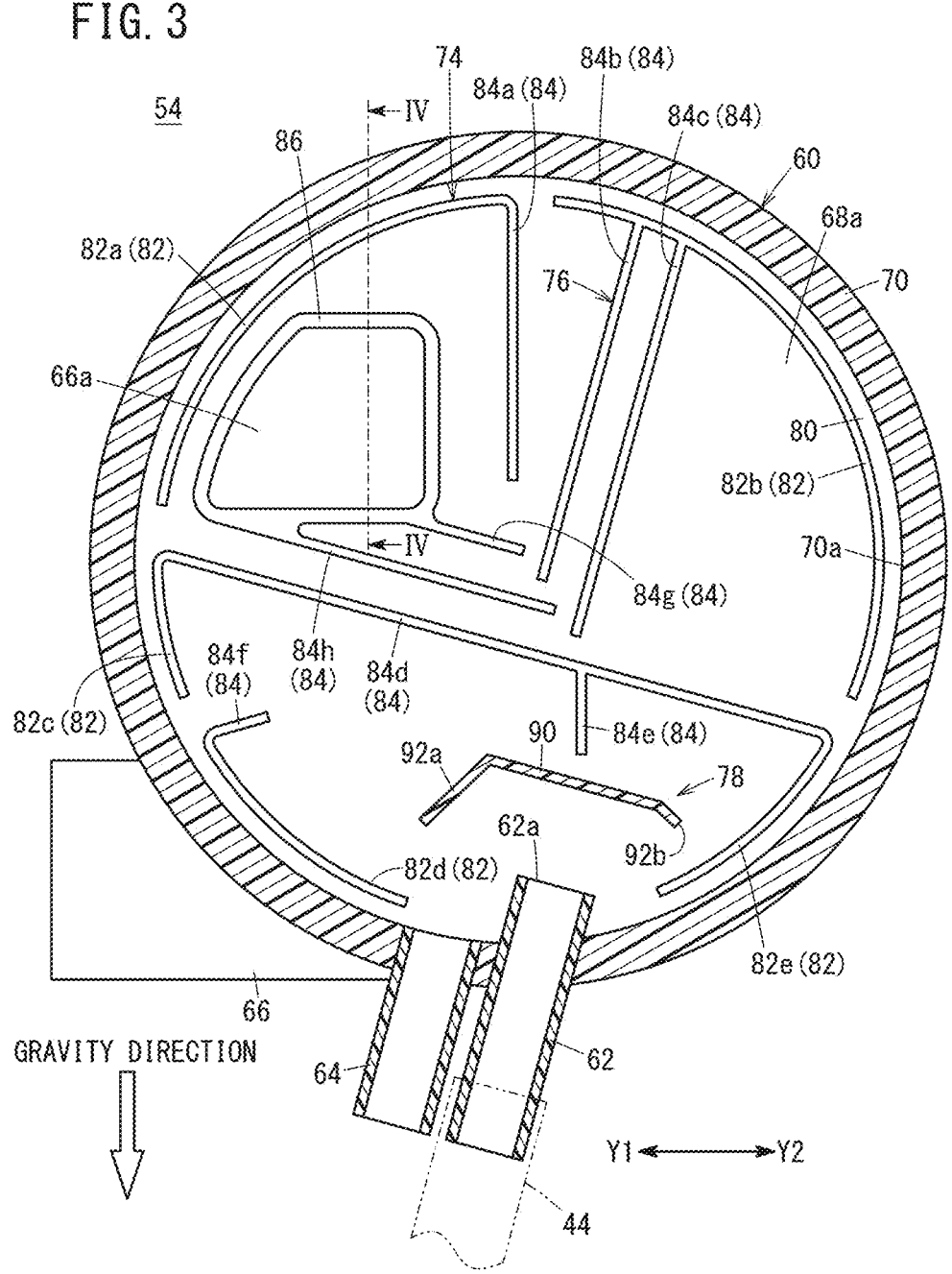

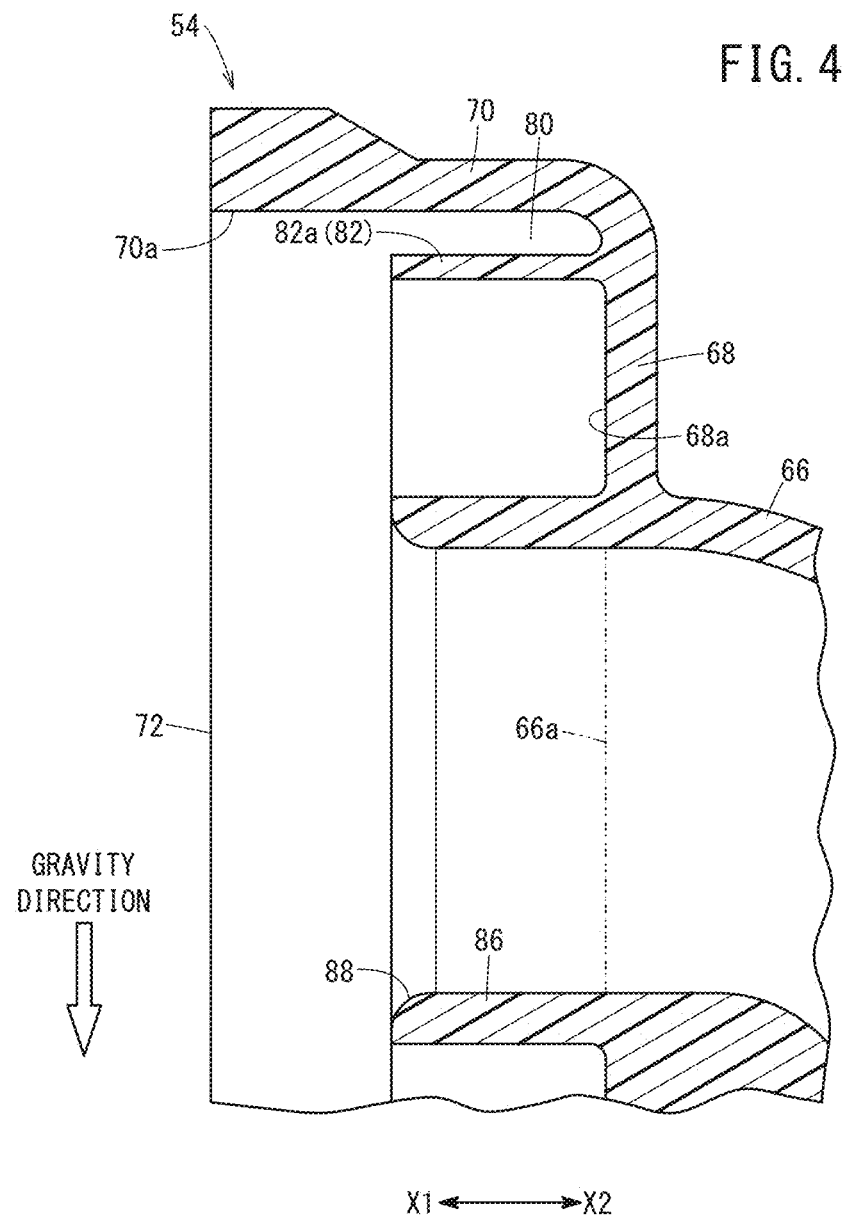

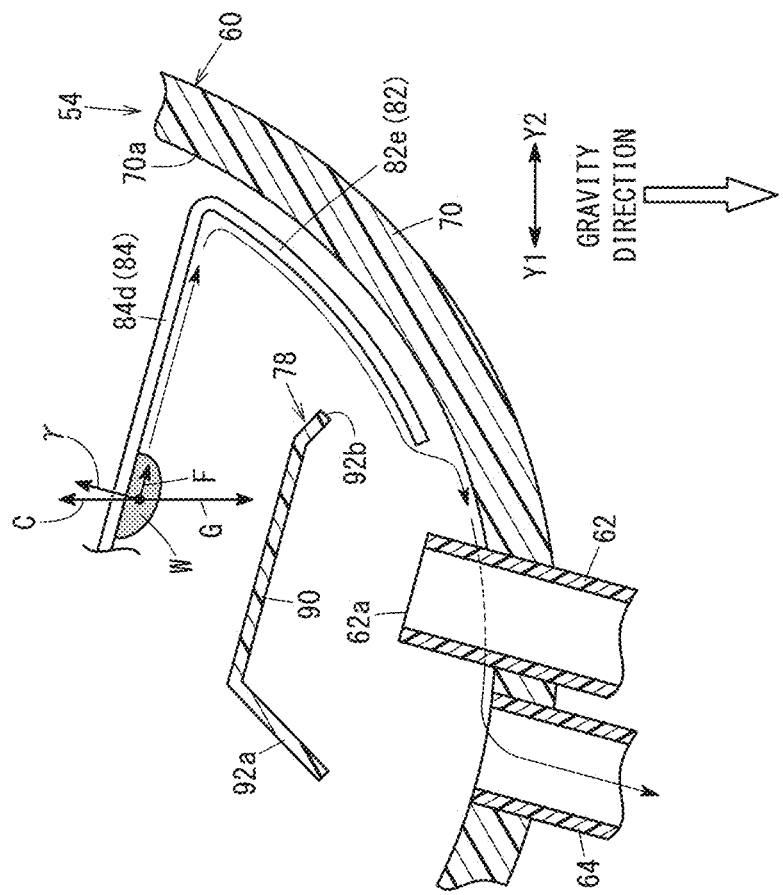
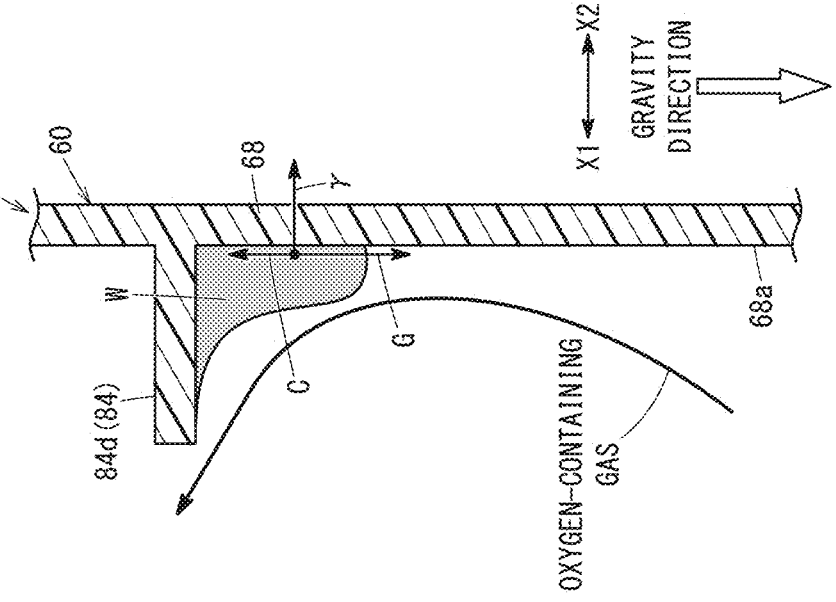

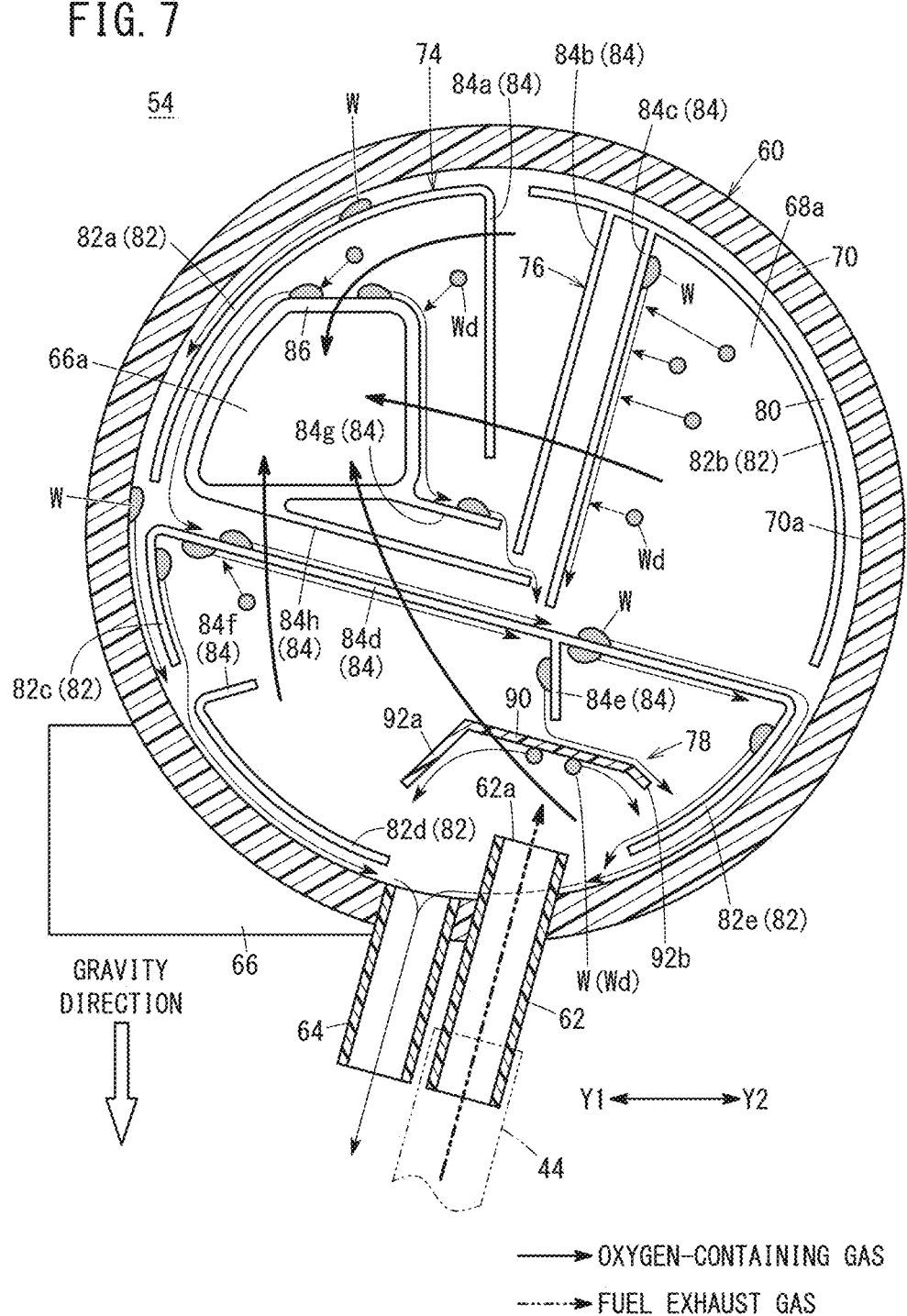

FUEL CELL SYSTEM

CROSS-REFERENCE TO RELATED APPLICATION

This application is based upon and claims the benefit of priority from Japanese Patent Application No. 2018-155930 filed on Aug. 23, 2018, the contents of which are incorporated herein by reference.

BACKGROUND OF THE INVENTION

Field of the Invention

The present invention relates to a fuel cell system including a fuel cell for generating electricity by electrochemical reactions of a fuel gas and an oxygen-containing gas.

Description of the Related Art

The fuel cell of this type includes an electrolyte membrane. The electrolyte membrane is a polymer ion exchange membrane of fluorocarbon resin, etc. In the state where the electrolyte membrane contains water, the electrolyte membrane functions as a proton ion conductive electrolyte membrane. In the state where the electrolyte membrane is dried, the proton ion conductivity is decreased, and the output of the fuel cell is decreased undesirably.

In an attempt to address the problem, according to the structure disclosed in Japanese Laid-Open Patent Publication No. 2006-147484, a humidifier for humidifying an oxygen-containing gas is provided in an oxygen-containing gas inlet channel, and a gas liquid separator is provided at an outlet of the humidifier so as to maintain suitable moisture of the electrolyte membrane.

SUMMARY OF THE INVENTION

In the fuel cell system, at the time of starting operation of the fuel cell system at low temperature, a fuel exhaust gas discharged from a fuel cell flows into an oxygen-containing gas inlet channel, and heat is produced by reaction induced by a cathode catalyst to warm up the fuel cell. Further, at the time of ventilating a fuel gas supply unit, a fuel gas is supplied into an oxygen-containing gas inlet channel to induce chemical reaction at a cathode catalyst to suppress exhaust fuel gas concentration (exhaust gas hydrogen concentration).

However, when a fuel exhaust gas containing liquid water is mixed with an oxygen-containing gas, and supplied to a fuel cell, excessive liquid water may flow into the fuel cell.

The present invention has been made taking such a problem into account, and an object of the present invention is to provide a fuel cell system in which it is possible to suppress entry of excessive water from an oxygen-containing gas inlet channel into a fuel cell, warm up the fuel cell rapidly, and suppress exhaust fuel gas concentration.

According to an aspect of the present invention, a fuel cell system is provided. The fuel cell system includes a fuel cell configured to generate electricity by an electrochemical reaction of a fuel gas and an oxygen-containing gas, an oxygen-containing gas inlet channel configured to guide the oxygen-containing gas to the fuel cell, a humidifier provided in the oxygen-containing gas inlet channel, a gas liquid separator provided downstream of the humidifier in the oxygen-containing gas inlet channel, and a fuel exhaust gas inlet channel configured to guide a fuel exhaust gas containing liquid water discharged from the fuel cell to the gas liquid separator, wherein the gas liquid separator is configured to perform gas liquid separation of both of the oxygen-containing gas humidified by the humidifier and the fuel exhaust gas containing the liquid water guided from the fuel exhaust gas inlet channel.

In the present invention, the gas liquid separator performs gas liquid separation of both of the oxygen-containing gas discharged from the humidifier and the fuel exhaust gas containing the liquid water discharged from the fuel cell. Therefore, it is possible to suppress entry of the excessive liquid water from the oxygen-containing gas inlet channel into the fuel cell. Thus, it is possible to produce heat by reaction of the fuel exhaust gas and the oxygen-containing gas induced by a cathode catalyst of the fuel cell. Accordingly, it is possible to warm up the fuel cell rapidly, and suppress the fuel exhaust gas concentration.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 2 is a vertical cross sectional with partial omission, showing a gas liquid separator provided for a humidifier;

FIG. 3 is a lateral cross sectional view taken along a line III-III in FIG. 2;

FIG. 4 is a vertical cross sectional view taken along a line IV-IV in FIG. 3;

FIG. 6A is a third view showing operation of the gas liquid separator;

FIG. 6B is a fourth view showing operation of the gas liquid separator; and

FIG. 7 is a view showing flow of liquid water in the gas liquid separator.

DESCRIPTION OF THE PREFERRED EMBODIMENTS

Hereinafter, a preferred embodiment of a fuel cell system according to the present invention will be described with reference to the accompanying drawings.

Figure 1:
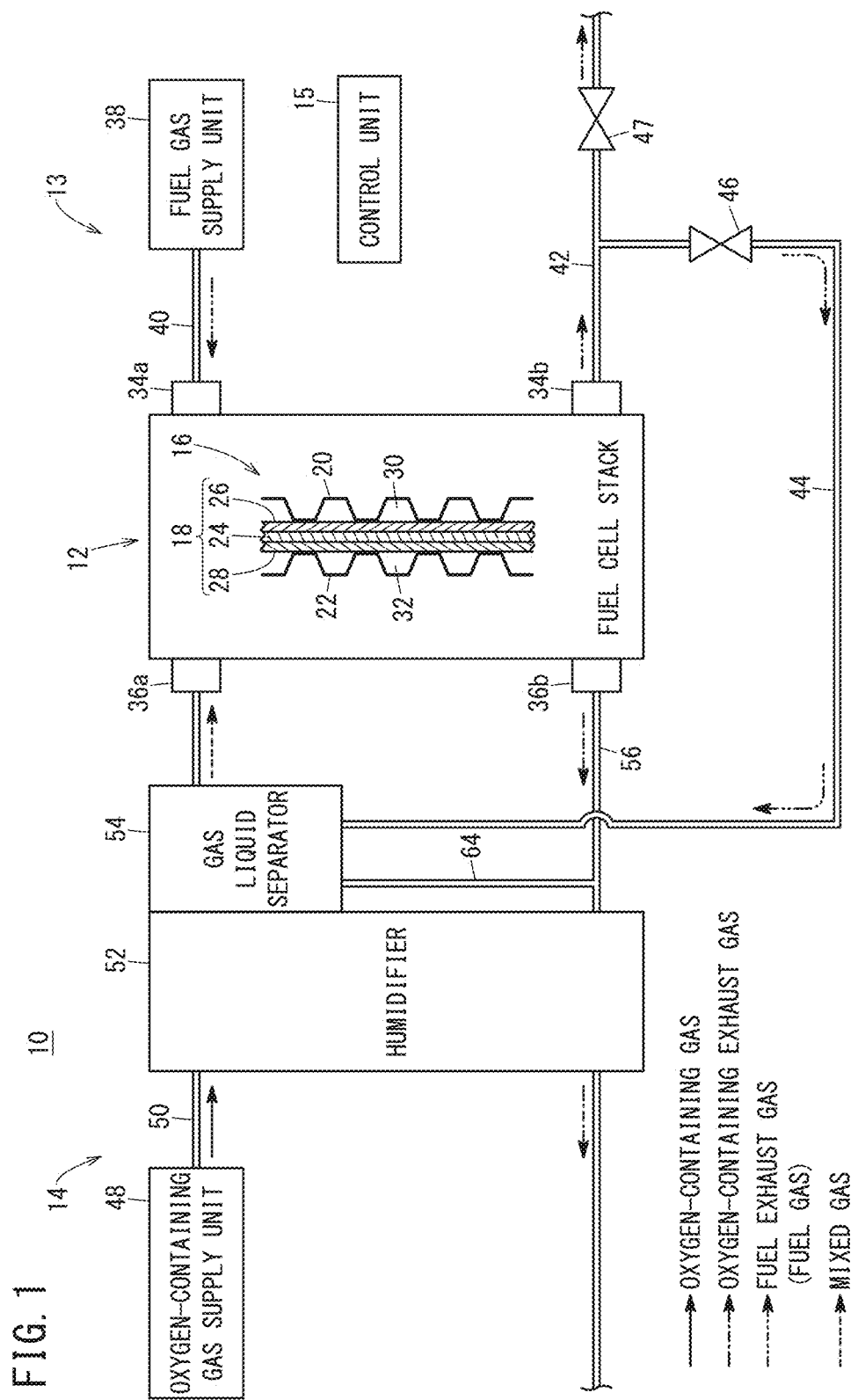
FIG. 1 is a diagram schematically showing structure of a fuel cell system according to an embodiment of the present invention.

A fuel cell system 10 shown in FIG. 1 is, e.g., mounted in a fuel cell vehicle (not shown) such as a fuel cell electric automobile. However, it should be noted that the fuel cell system 10 may be mounted in any of various moving objects other than the fuel cell vehicle, or the fuel cell system 10 may be used in stationary applications.

The fuel cell system 10 includes a fuel cell stack 12 as a fuel cell, a fuel gas supply apparatus 13, an oxygen-containing gas supply apparatus 14, and a control unit 15. Though not shown, the fuel cell system 10 further includes a coolant supply apparatus for cooling the fuel cell stack 12, and a battery, etc.

The fuel cell stack 12 generates electricity by electrochemical reactions of a fuel gas (e.g., a hydrogen gas) and an oxygen-containing gas (e.g., the air). The fuel cell stack 12 includes a plurality of power generation cells 16 stacked together in a horizontal direction. The power generation cell 16 is formed by sandwiching a membrane electrode assembly 18 between a first separator 20 and a second separator 22. The first separator 20 and the second separator 22 are metal separators or carbon separators.

The membrane electrode assembly 18 includes a solid polymer electrolyte membrane 24, and an anode 26 and a cathode 28 provided on both surfaces of the solid polymer electrolyte membrane 24. For example, the solid polymer electrolyte membrane 24 is a thin membrane of perfluorosulfonic acid containing water. A fluorine based electrolyte may be used as the solid polymer electrolyte membrane 24. Alternatively, an HC (hydrocarbon) based electrolyte may be used as the solid polymer electrolyte membrane 24.

A fuel gas flow field 30 for guiding a fuel gas to the anode 26 is provided between the first separator 20 and the membrane electrode assembly 18. An oxygen-containing gas flow field 32 for guiding an oxygen-containing gas to the cathode 28 is provided between the second separator 22 and the membrane electrode assembly 18.

A fuel gas inlet 34a, a fuel gas outlet 34b, an oxygen-containing gas inlet 36a, and an oxygen-containing gas outlet 36b are provided in the fuel cell stack 12. The fuel gas inlet 34a extends through each of the power generation cells 16 in the stacking direction, and the fuel gas inlet 34a is connected to the supply side of the fuel gas flow field 30. The fuel gas outlet 34b extends through each of the power generation cells 16 in the stacking direction, and the fuel gas is connected to the discharge side of the fuel gas flow field 30. The fuel gas flow field 30, the fuel gas inlet 34a, and the fuel gas outlet 34b form an anode channel.

The oxygen-containing gas inlet 36a extends through each of the power generation cells 16 in the stacking direction, and the oxygen-containing gas inlet 36a is connected to the supply side of the oxygen-containing gas flow field 32. The oxygen-containing gas outlet 36b extends through each of the power generation cells 16 in the stacking direction, and the oxygen-containing gas outlet 36b is connected to the discharge side of the oxygen-containing gas flow field 32. The oxygen-containing gas flow field 32, the oxygen-containing gas inlet 36a, and the oxygen-containing gas outlet 36b form a cathode channel.

The fuel gas supply apparatus 13 supplies a fuel gas to the fuel cell stack 12. The fuel gas supply apparatus 13 includes a fuel gas supply unit 38, and a fuel gas inlet channel 40 for guiding the fuel gas supplied from the fuel gas supply unit 38 to the fuel gas inlet 34a. The fuel gas supply unit 38 includes a fuel gas tank (hydrogen gas tank) (not shown), etc. for storing a high pressure hydrogen (high pressure hydrogen).

A fuel gas discharge channel 42 is coupled to the fuel gas outlet 34b of the fuel cell stack 12. After at least some of the fuel gas is consumed at the anode 26, the fuel gas is discharged as a fuel exhaust gas from the fuel cell stack 12 through the fuel gas discharge channel 42.

A fuel exhaust gas inlet channel 44 is coupled to the fuel gas discharge channel 42. The fuel exhaust gas inlet channel 44 guides the fuel exhaust gas and liquid water W (see FIG. 7) to a gas liquid separator 54 of the oxygen-containing gas supply apparatus 14. An open/close valve 46 is provided in the fuel exhaust gas inlet channel 44. The open/close valve 46 is capable of switching between the open state in which the fuel gas discharge channel 42 and the fuel exhaust gas inlet channel 44 are connected together, and the closed state in which the fuel gas discharge channel 42 and the fuel exhaust gas inlet channel 44 are disconnected from each other.

An open/close valve 47 is provided downstream of a position of the fuel gas discharge channel 42 coupled to the fuel exhaust gas inlet channel 44. The open/close valve 47 opens and closes the fuel gas discharge channel 42. The fuel exhaust gas guided to a position of the fuel gas discharge channel 42 downstream of the open/close valve 47 may be supplied into the fuel gas supply unit 38 and circulated into the fuel cell stack 12, or may be diluted by an oxygen-containing exhaust gas, and discharged to the atmospheric air.

The oxygen-containing gas supply apparatus 14 supplies the oxygen-containing gas to the fuel cell stack 12. The oxygen-containing gas supply apparatus 14 includes an oxygen-containing gas supply unit 48, and an oxygen-containing gas inlet channel 50 for guiding the oxygen-containing gas supplied from the oxygen-containing gas supply unit 48 to the oxygen-containing gas inlet 36a. As the oxygen-containing gas supply unit 48, for example, an air pump for compressing the atmospheric air, and supplying the compressed air is used.

A humidifier 52 and the gas liquid separator 54 are provided in the oxygen-containing gas inlet channel 50. The humidifier 52 exchanges the liquid water W and the heat between the oxygen-containing gas (supplied air) and the oxygen-containing exhaust gas (discharged air). Stated otherwise, the humidifier 52 humidifies, and heats the oxygen-containing gas by the oxygen-containing exhaust gas. The gas liquid separator 54 is provided downstream of the humidifier 52 in the oxygen-containing gas inlet channel 50. The gas liquid separator 54 performs gas liquid separation of both of the oxygen-containing gas humidified by the humidifier 52 and the fuel exhaust gas containing the liquid water W guided from the fuel exhaust gas inlet channel 44. The gas liquid separator 54 will be described later in detail.

An oxygen-containing gas discharge channel 56 is coupled to the oxygen-containing gas outlet 36b of the fuel cell stack 12. After at least some of the oxygen-containing gas is consumed at the cathode 28, the oxygen-containing gas discharge channel 56 discharges the oxygen-containing gas as the oxygen-containing exhaust gas into the atmospheric air through the humidifier 52.

As shown in FIGS. 2 and 3, the gas liquid separator 54 is provided integrally with the humidifier 52. The gas liquid separator 54 includes a separator body 60, a fuel exhaust gas inlet 62, a water drainage part 64, and an outlet channel 66. The vertical cross section of the separator body 60 has a substantially U-shape. That is, the separator body 60 includes a proximal part 68 having a separation surface 68a extending in a substantially vertical direction, and a circumferential wall 70 protruding from the proximal part 68 toward the humidifier 52 (in the direction indicated by an arrow X1) in a manner that the circumferential wall 70 surrounds the separation surface 68a.

The proximal part 68 extends in a flat plate shape. The circumferential wall 70 has an annular shape, and the circumferential wall 70 is provided in an outer marginal portion of the proximal part 68. An oxygen-containing gas inlet port 72 is formed at a protruding end of the circumferential wall 70, for supplying the oxygen-containing gas humidified in the humidifier 52 into the separator body 60. The oxygen-containing gas inlet port 72 is oriented in the direction (indicated by the arrow X1) perpendicular to the separation surface 68a, to face the separation surface 68a. The circumferential wall 70 has an inner surface 70a extending in an annular shape.

The fuel exhaust gas inlet 62 allows the fuel exhaust gas containing the liquid water W guided from the fuel exhaust gas inlet channel 44, to be supplied into the separator body 60. Stated otherwise, the fuel exhaust gas inlet 62 is provided below the separator body 60 in a manner that the fuel exhaust gas containing the liquid water W flows upward from the fuel exhaust gas inlet 62. The fuel exhaust gas inlet 62 has a tubular shape.

The upper end of the fuel exhaust gas inlet 62 protrudes into the separator body 60. The fuel exhaust gas inlet channel 44 is coupled to a lower end of the fuel exhaust gas inlet 62. An opening 62a at an upper end of the fuel exhaust gas inlet 62 is oriented upward (obliquely upward). That is, the oxygen-containing gas inlet port 72 is oriented in the direction (indicated by the arrow X1) intersecting with a direction in which the opening 62a of the fuel exhaust gas inlet 62 is oriented (see FIG. 2).

As shown in FIG. 3, the water drainage part 64 discharges the liquid water W (see FIG. 7) in the separator body 60 to the outside. Specifically, the water drainage part 64 is coupled to the oxygen-containing gas discharge channel 56 (see FIG. 1). The water drainage part 64 has a tubular shape, and the water drainage part 64 is provided at a lower position (lowermost position) of the circumferential wall 70. In an example of FIG. 3, the water drainage part 64 is provided adjacent to the fuel exhaust gas inlet 62. An upper end surface of the water drainage part 64 is continuous with the inner surface 70a of the circumferential wall 70. That is, the water drainage part 64 does not protrude into the separator body 60.

In FIG. 2, the outlet channel 66 discharges the oxygen-containing gas and the fuel exhaust gas from the separator body 60. Specifically, the outlet channel 66 guides the gas after gas liquid separation (mixed gas of the oxygen-containing gas and the fuel exhaust gas) toward the downstream side of the gas liquid separator 54 in the oxygen-containing gas inlet channel 50. The outlet channel 66 has a tubular shape (cylindrical shape), and the outlet channel 66 is provided on a side of the proximal part 68 (in a direction indicated by an arrow X2) opposite to the humidifier 52. As shown in FIG. 3, an outlet port 66a connected to an inner hole of the outlet channel 66 is formed in the separation surface 68a. The outlet port 66a is positioned above the center of the separation surface 68a in the vertical direction, and on one side (in a direction indicated by an arrow Y1) shifted from the center in the left-right direction.

A first water guide 74, a second water guide 76, and a fuel exhaust gas separation wall 78 are provided in the separation surface 68a. The first water guide 74 guides the liquid water W (see FIG. 7) attached to the inner surface 70a of the circumferential wall 70 downward. The first water guide 74 includes a plurality of outer water guide plates 82 facing the inner surface 70a of the circumferential wall 70 through a gap and extending in a circumferential direction of the circumferential wall 70 in a manner that a water guide channel 80 is formed between the plurality of outer water guide plates 82 and the inner surface 70a of the circumferential wall 70. The plurality of outer water guide plates 82 are provided with a gap between each other in the circumferential direction of the circumferential wall 70. The outer water guide plates 82 extend in a circular arc shape along the circumferential direction of the circumferential wall 70.

In the embodiment of the present invention, as the plurality of outer water guide plates 82, the first water guide 74 includes a first outer water guide plate 82a, a second outer water guide plate 82b, a third outer water guide plate 82c, a fourth outer water guide plate 82d, and a fifth outer water guide plate 82e.

The first outer water guide plate 82a extends downward in a circular arc shape from an upper end of the separation surface 68a to one of side marginal portions (in a direction indicated by an arrow Y1) of the separation surface 68a. An upper end of the first outer water guide plate 82a is provided at a position shifted from the outlet port 66a toward the other side marginal portion (in a direction indicated by an arrow Y2) of the separation surface 68a. The lower end of the first outer water guide plate 82a is positioned at the lower end of the outlet port 66a in the direction indicated by the arrow Y1. Specifically, the lower end of the first outer water guide plate 82a is positioned slightly above the center of the separation surface 68a in the vertical direction. That is, the first outer water guide plate 82a covers the outlet port 66a from above.

The second outer water guide plate 82b extends downward in a circular arc shape from a position slightly shifted from an upper end of the first outer water guide plate 82a in a direction indicated by the arrow Y2 (upper end of the separation surface 68a) to the other side marginal portion (indicated by the arrow Y2) of the separation surface 68a. The lower end of the second outer water guide plate 82b is positioned below the lower end of the first outer water guide plate 82a. Stated otherwise, the lower end of the second outer water guide plate 82b is positioned slightly below the center of the separation surface 68a in the vertical direction.

The third outer water guide plate 82c extends downward from a position below the lower end of the first outer water guide plate 82a. The fourth outer water guide plate 82d extends downward from a position below the lower end of the third outer water guide plate 82c up to a position before the water drainage part 64. The fifth outer water guide plate 82e extend downward from a position below the lower end of the second outer water guide plate 82b up to a position before the fuel exhaust gas inlet 62. The interval between the lower end of the fourth outer water guide plate 82d and the lower end of the fifth outer water guide plate 82e is determined in a manner to enable the fuel exhaust gas inlet 62 and the water drainage part 64 can be provided between the lower end of the fourth outer water guide plate 82d and the lower end of the fifth outer water guide plate 82e.

The second water guide 76 collects liquid water W (see FIG. 7) attached to the separation surface 68a, and guides the liquid water W downward. The second water guide 76 includes a plurality of inner water guide plates 84 provided inside the plurality of outer water guide plates 82 and an annular water guide plate 86 protruding from a marginal portion of the outlet port 66a toward the position of the oxygen-containing gas inlet port 72. The plurality of inner water guide plates 84 extend straight.

In the embodiment of the present invention, as the plurality of inner water guide plates 84, the second water guide 76 includes a first inner water guide plate 84a, a second inner water guide plate 84b, a third inner water guide plate 84c, a fourth inner water guide plate 84d, a fifth inner water guide plate 84e, a sixth inner water guide plate 84f, a seventh inner water guide plate 84g, and an eighth inner water guide plate 84h.

The first inner water guide plate 84a extends vertically downward from the upper end of the first outer water guide plate 82a. The first inner water guide plate 84a is provided at a position shifted from the outlet port 66a in the direction indicated by the arrow Y2. The second inner water guide plate 84b and the third inner water guide plate 84c extend downward from a position adjacent to the upper end of the second outer water guide plate 82b with slight inclination in the direction indicated by the arrow Y1. The second inner water guide plate 84b and the third inner water guide plate 84c are in parallel to each other.

The fourth inner water guide plate 84d couples the upper end of the third outer water guide plate 82c and the upper end of the fifth outer water guide plate 82e together. The fourth inner water guide plate 84d is inclined downward in the direction indicated by the arrow Y2. The fifth inner water guide plate 84e extends downward from a position in the middle of the fourth inner water guide plate 84d.

The sixth inner water guide plate 84f extends upward from the upper end of the fourth outer water guide plate 82d with inclination in the direction indicated by the arrow Y2. The seventh inner water guide plate 84g and the eighth inner water guide plate 84h extend from the lower end of the annular water guide plate 86 in the direction indicated by the arrow Y2 with slight downward inclination. The seventh inner water guide plate 84g and the eighth inner water guide plate 84h extend in parallel to the fourth inner water guide plate 84d.

As shown in FIG. 4, an R surface 88 (curved surface) is provided in the inner marginal portion of the protruding end of the annular water guide plate 86. In FIG. 2, the height H1 of the first water guide 74 (the outer water guide plate 82) from the separation surface 68a is the same as the height H2 of the second water guide 76 (the inner water guide plate 84 and the annular water guide plate 86) from the separation surface 68a. Specifically, the heights H1, H2 are determined to be about the half of the protruding length of the circumferential wall 70. It should be noted that the heights H1, H2 can be determined freely.

As shown in FIGS. 2 and 3, the fuel exhaust gas separation wall 78 is provided to face the opening 62a of the fuel exhaust gas inlet 62. That is, the opening 62a of the fuel exhaust gas inlet 62 is positioned below the fuel exhaust gas separation wall 78. The outlet port 66a is positioned above the fuel exhaust gas separation wall 78. In FIG. 2, the height H3 of the fuel exhaust gas separation wall 78 from the separation surface 68a is larger than the heights H1, H2.

As shown in FIG. 3, the fuel exhaust gas separation wall 78 is formed in a plate shape, and positioned below the fourth inner water guide plate 84d. The fuel exhaust gas separation wall 78 includes a separation wall body 90 and protrusions 92a, 92b for guiding the liquid water W attached to the separation wall body 90 downward. The separation wall body 90 is positioned below the fifth inner water guide plate 84e to face the opening 62a of the fuel exhaust gas inlet 62.

The separation wall body 90 extends in the direction indicated by the arrow Y2 with slight downward inclination. The protrusion 92a extends downward from the end of the separation wall body 90 in the direction indicated by the arrow Y1, and inclined in the direction indicated by the arrow Y1. The protrusion 92b extends downward from the end of the separation wall body 90 indicated by the arrow Y2, and inclined in the direction indicated by the arrow Y2.

The control unit 15 controls the entire fuel cell system 10. The control unit 15 controls opening/closing operation of the open/close valves 46, 47.

Next, operation of the fuel cell system 10 at the time of starting its operation will be described below. It should be noted that, at the time of starting operation of the fuel cell system 10, the control unit 15 opens the open/close valve 46, and closes the open/close valve 47.

As shown in FIG. 1, at the time of starting operation of the fuel cell system 10, in the fuel gas supply apparatus 13, the fuel gas is supplied to the fuel gas inlet 34a from the fuel gas supply unit 38 to the fuel gas inlet channel 40. The fuel gas supplied to the fuel gas inlet 34a flows into the fuel gas flow field 30, and move along the fuel gas flow field 30. Thus, the fuel gas is supplied to the anode 26 of the membrane electrode assembly 18.

In the oxygen-containing gas supply apparatus 14, the oxygen-containing gas flows from the oxygen-containing gas supply unit 48 into the oxygen-containing gas inlet channel 50. After the oxygen-containing gas which flows into the oxygen-containing gas inlet channel 50 is humidified by the humidifier 52, the excessive liquid water W is removed by the gas liquid separator 54, and the oxygen-containing gas is supplied to the oxygen-containing gas inlet 36a. The oxygen-containing gas supplied to the oxygen-containing gas inlet 36a flows into the oxygen-containing gas flow field 32, and the oxygen-containing gas moves along the oxygen-containing gas flow field 32, and the oxygen-containing gas is supplied to the cathode 28 of the membrane electrode assembly 18.

Thus, in each of the membrane electrode assemblies 18, the fuel gas supplied to the anode 26 and the oxygen in the oxygen-containing gas supplied to the cathode 28 are partially consumed in the electrochemical reactions to generate electricity.

Then, after some of the fuel gas supplied to the anode 26 is consumed, the fuel gas containing the liquid water W is discharged as the fuel exhaust gas from the fuel gas outlet 34b into the fuel gas discharge channel 42. At this time, since the open/close valve 46 is opened, and the open/close valve 47 is closed, the fuel exhaust gas containing the liquid water W discharged into the fuel gas discharge channel 42 flows into the gas liquid separator 54 through the fuel exhaust gas inlet channel 44.

After some of the oxygen-containing gas supplied to the cathode 28 is consumed, the oxygen-containing gas is discharged as the oxygen-containing exhaust gas from the oxygen-containing gas outlet 36b into the humidifier 52 through the oxygen-containing gas discharge channel 56. In the humidifier 52, the heat and the liquid water W in the oxygen-containing exhaust gas are exchanged with the oxygen-containing gas guided from the oxygen-containing gas inlet channel 50. The oxygen-containing exhaust gas which flowed through the humidifier 52 is discharged to the outside.

In the gas liquid separator 54, gas liquid separation of the oxygen-containing gas humidified by the humidifier 52 and the fuel exhaust gas containing the liquid water W is performed. The oxygen-containing gas and the fuel exhaust gas after the gas liquid separation are mixed. The mixed gas discharged from the gas liquid separator 54 is guided from the oxygen-containing gas inlet 36a into the cathode 28. Thus, since heat is produced in the reaction of the mixed gas induced by the cathode catalyst, the fuel cell stack 12 is warmed up rapidly. Thus, improvement in the performance of starting operation of the fuel cell system 10 at low temperature is achieved. Further, in the state where the fuel exhaust gas is mixed with the oxygen-containing gas, the fuel exhaust gas is used at the cathode catalyst of the fuel cell stack 12. Therefore, the concentration of the fuel exhaust gas discharged into the atmospheric air is reduced sufficiently.

Next, operation of the gas liquid separator 54 will be described.

Figures 5A, 5B:
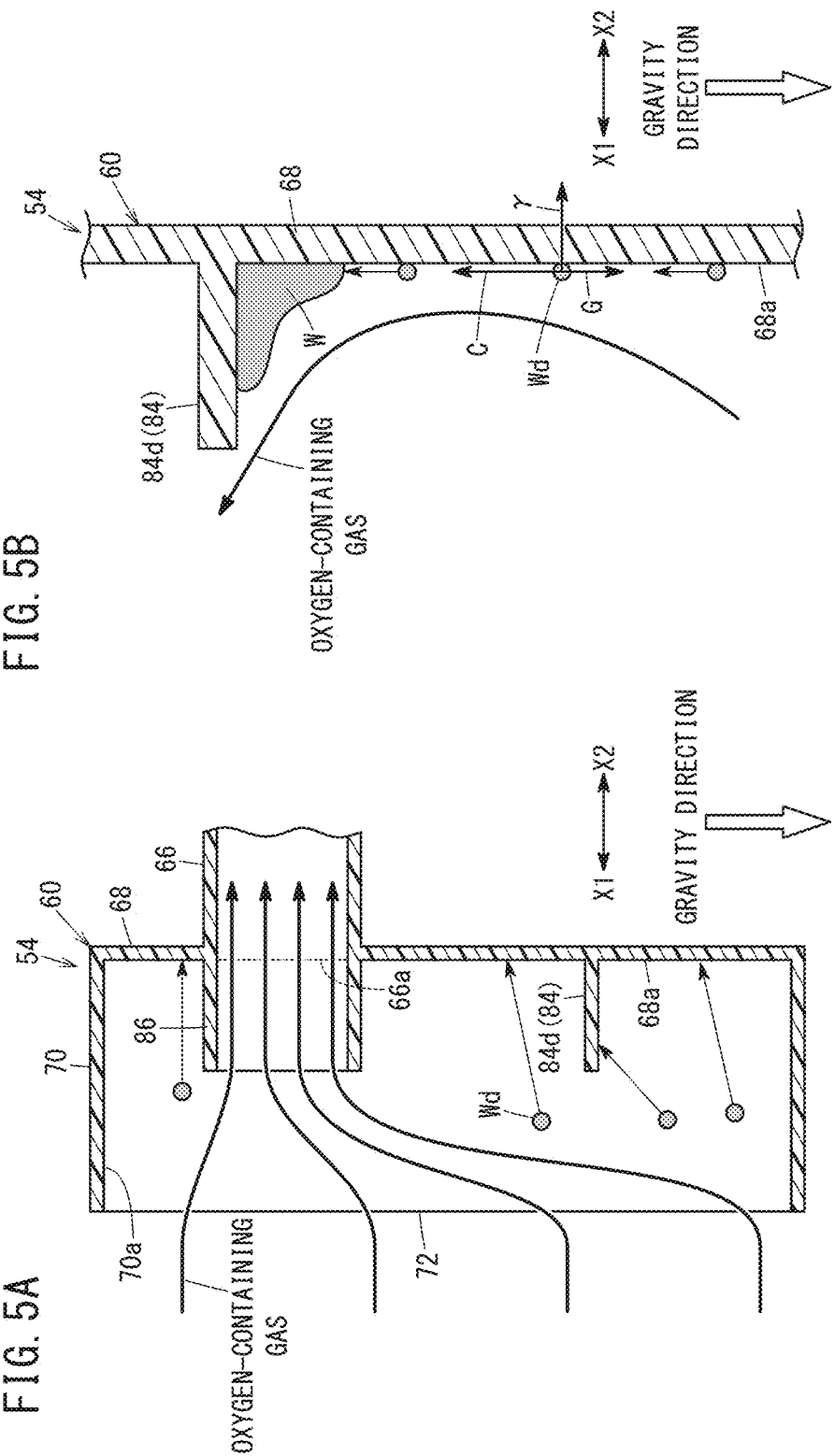
FIG. 5A is a first view showing operation of the gas liquid separator.
FIG. 5B is a second view showing operation of the gas liquid separator.

As shown in FIG. 5A, the oxygen-containing gas humidified by the humidifier 52 flows from the oxygen-containing gas inlet port 72 into the separator body 60, and the oxygen-containing gas collide with the separation surface 68a. After the oxygen-containing gas collides with the separation surface 68a, the oxygen-containing gas moves along the separation surface 68a, passes over the plurality of inner water guide plates 84, and the oxygen-containing gas is guided into the outlet port 66a. At this time, since the inertial force of liquid is relatively larger (in view of the specific gravity difference between gas and liquid), the liquid water W in the oxygen-containing gas is attached to the separation surface 68a as water droplets Wd.

As shown in FIG. 5B, an interfacial tension γ in a direction toward the separation surface 68a, the gravity G, and an air drag C are applied to the water droplets Wd attached to the separation surface 68a. It should be noted that an example of FIG. 5B shows a case where the oxygen-containing gas which collided with the separation surface 68a flows upward along the separation surface 68a. In this regard, the air drag C applied to the water droplets Wd is larger than the gravity G. Therefore, the water droplets Wd move in the direction of the air drag C, i.e., move along the separation surface 68a in the flow direction of the oxygen-containing gas (upward in FIG. 5B). At this time, the condensed water on the separation surface 68a moves together with the water droplets Wd.

As shown in FIG. 6A, the water droplets Wd which moved along the separation surface 68a are collected by the second water guide 76 (inner water guide plate 84), and combined together to have increased sizes. As a result, the gravity G of the liquid water W formed by joining a large quantity of water droplets Wd is increased. In the meanwhile, the oxygen-containing gas flows to pass over the inner water guide plate 84. That is, since the flow rate vector of the oxygen-containing gas changes by the inner water guide plate 84, the air drag C applied to the liquid water W is reduced.

When the gravity G applied to the liquid water W becomes larger than the air drag C, the liquid water W moves in a direction of a resultant force F of the interfacial tension γ, the gravity G, and the air drag C. Specifically, as shown in FIG. 6B, for example, the liquid water W attached to the lower surface of the fourth inner water guide plate 84d flows along the lower surface of the fourth inner water guide plate 84d obliquely downward (in the direction indicated by the arrow Y2) up to the fifth outer water guide plate 82e. Further, the liquid water W which reached the fifth outer water guide plate 82e flows downward along the fifth outer water guide plate 82e, and the liquid water W is discharged from the water drainage part 64 to the outside.

As shown in FIG. 7, the liquid water W (water droplets Wd) separated from the oxygen-containing gas, and attached to the separation surface 68a is collected by the plurality of inner water guide plates 84, guided downward, and then, discharged to the outside through the water drainage part 64.

The fuel exhaust gas containing the liquid water W guided from the fuel exhaust gas inlet 62 collides with the separation wall body 90. When the fuel exhaust gas collides with the separation wall body 90, the liquid water W in the fuel exhaust gas is attached to the separation wall body 90 by a relatively-large inertial force of liquid. The liquid water W attached to the separation wall body 90 is guided downward by the protrusions 92a, 92b, and is discharged to the outside through the water drainage part 64.

It should be noted that, under the effect of the gravity G, the condensed water attached to the inner surface 70a of the circumferential wall 70 passes through the water guide channel 80 between the first water guide 74 and the inner surface 70a of the circumferential wall 70, and the condensed water is discharged to the outside through the water drainage part 64. After the liquid water W is separated, the oxygen-containing gas and the fuel exhaust gas are mixed together in the separator body 60, and then, guided from the outlet port 66a to the outlet channel 66.

The fuel cell system 10 offers the following advantages.

In the fuel cell system 10, the gas liquid separator 54 performs gas liquid separation of both of the oxygen-containing gas humidified by the humidifier 52 and the fuel exhaust gas containing the liquid water W discharged from the fuel cell stack 12. Therefore, it is possible to suppress entry of the excessive liquid water W from the oxygen-containing gas inlet channel 50 into the fuel cell stack 12. Therefore, since heat can be produced in the reaction of the fuel exhaust gas and the oxygen-containing gas induced by the cathode catalyst of the fuel cell stack 12, it is possible to warm up the fuel cell stack 12 rapidly. Further, since the fuel exhaust gas can be used in the chemical reactions at the cathode catalyst, and diluted using the oxygen-containing gas, it is possible to effectively reduce concentration of the fuel gas released into the atmospheric air.

The gas liquid separator 54 includes the separator body 60 including the proximal part 68 having the separation surface 68a extending in the substantially vertical direction. The separator body 60 has the oxygen-containing gas inlet port 72 configured to supply the oxygen-containing gas humidified by the humidifier 52 into the separator body 60 in a manner that the oxygen-containing gas inlet port 72 faces the separation surface 68a.

In the structure, since the humidified oxygen-containing gas supplied from the oxygen-containing gas inlet port 72 can be brought into collision with the separation surface 68a, it is possible to separate the humidified oxygen-containing gas into the gas (oxygen-containing gas) and the liquid (liquid water W) using the relatively-large inertial force of liquid.

The separator body 60 includes the circumferential wall 70 protruding from the proximal part 68 in a manner to surround the separation surface 68a. The circumferential wall 70 has the fuel exhaust gas inlet 62 to supply the fuel exhaust gas containing the liquid water W guided from the fuel exhaust gas inlet channel 44, into the separator body 60. The separator body 60 includes the fuel exhaust gas separation wall 78 that faces the opening 62a of the fuel exhaust gas inlet 62.

In the structure, since the fuel exhaust gas containing the liquid water W supplied from the fuel exhaust gas inlet 62 can be brought into collision with the fuel exhaust gas separation wall 78, it is possible to separate the fuel exhaust gas containing the liquid water W into the gas (fuel exhaust gas) and the liquid (liquid water W) using the relatively-large inertial force of liquid.

The fuel exhaust gas inlet 62 is provided in the separator body 60 in a manner that the fuel exhaust gas containing the liquid water W is discharged upward. In the structure, since the fuel exhaust gas containing the liquid water W can be brought into collision with the fuel exhaust gas separation wall 78 from below, it is possible to perform gas liquid separation efficiently.

The separation surface 68a includes the first water guide 74 configured to guide the liquid water W attached to the inner surface 70a of the circumferential wall 70 downward, and the second water guide 76 configured to collect the liquid water W attached to the separation surface 68a, and guide the liquid water W downward.

In the structure, the liquid water W attached to the inner surface 70a of the circumferential wall 70 and the separation surface 68a can be guided downward efficiently by the first water guide 74 and the second water guide 76.

The circumferential wall 70 includes the inner surface 70a extending in the annular shape. The first water guide 74 includes the plurality of outer water guide plates 82 that face the inner surface 70a of the circumferential wall 70 through the gap and that extend in the circumferential direction of the circumferential wall 70 in a manner that the water guide channel 80 is formed between the plurality of outer water guide plates 82 and the inner surface 70a of the circumferential wall 70. The plurality of outer water guide plates 82 are provided with gaps between each other in the circumferential direction of the circumferential wall 70.

In the structure, the liquid water W attached to the inner surface 70a of the circumferential wall 70 is guided downward through the water guide channel 80. Therefore, it is possible to suppress entry of the liquid water W attached to the inner surface 70a of the circumferential wall 70 into the inside of the plurality of outer water guide plates 82. Further, it is possible to allow the liquid water W attached to the separation surface 68a to be discharged into the water guide channel 80 through the gap between the adjacent outer water guide plates 82.

The second water guide 76 includes the plurality of inner water guide plates 84 provided inside the plurality of outer water guide plates 82. In the structure, it is possible to effectively collect the liquid water W attached to the separation surface 68a by the plurality of inner water guide plates 84, and guide the liquid water W downward.

The separation surface 68a has the outlet port 66a configured to discharge the oxygen-containing gas and the fuel exhaust gas after separation of the liquid water W. The plurality of outer water guide plates 82 are provided in a manner that at least parts of the plurality of outer water guide plates 82 cover the outlet port 66a from the above.

In the structure, it is possible to effectively suppress entry of the liquid water W attached to the inner surface 70a of the circumferential wall 70 into the outlet port 66a by the outer water guide plates 82 (first outer water guide plate 82a).

The second water guide 76 includes the annular water guide plate 86 protruding from a marginal portion of the outlet port 66a toward a position where the oxygen-containing gas inlet port 72 is present.

In the structure, it is possible to effectively suppress entry of the liquid water W attached to the separation surface 68a into the outlet port 66a by the annular water guide plate 86.

The R surface 88 is provided in the inner marginal portion of the protruding end of the annular water guide plate 86. In the structure, it is possible to reduce the pressure loss when the oxygen-containing gas and the fuel exhaust gas after separation of the liquid water W flows into the outlet port 66a.

The height H3 of the fuel exhaust gas separation wall 78 from the separation surface 68a may be larger than the heights H1, H2 of the first water guide 74 and the second water guide 76 from the separation surface 68a. In the structure, it is possible to effectively bring the fuel exhaust gas containing the liquid water W into collision with the fuel exhaust gas separation wall 78.

The fuel exhaust gas separation wall 78 includes the separation wall body 90 facing the opening 62a of the fuel exhaust gas inlet 62, and the protrusions 92a, 92b protruding downward from the separation wall body 90. In the structure, it is possible to guide the liquid water W attached to the separation wall body 90 downward, by the protrusions 92a, 92b.

The separator body 60 has the water drainage part 64 configured to discharge the separated liquid water W to the outside. In the structure, it is possible to suppress stagnation of the liquid water W in the separator body 60.

The gas liquid separator 54 is provided integrally with the humidifier 52. In the structure, it is possible to reduce the size of the fuel cell system 10 in comparison with the case of providing the gas liquid separator 54 separately from the humidifier 52, and achieve reduction of the number of component parts.

The number, the shape, and the size of the plurality of the outer water guide plates 82 can be determined freely. The number, the shape, and the size of the plurality of the inner water guide plates 84 can be determined freely. The gas liquid separator 54 may be provided separately from the humidifier 52. That is, the gas liquid separator 54 only has to be provided downstream of the humidifier 52 in the oxygen-containing gas inlet channel 50.

The fuel exhaust gas inlet 62 is not limited to the example where the fuel exhaust gas inlet 62 is provided at the lower position of the circumferential wall 70. The fuel exhaust gas inlet 62 may be provided at the upper position of the circumferential wall 70, or the central position of the circumferential wall 70 in the vertical direction. The height H3 of the fuel exhaust gas separation wall 78 may be same as the height H1 of the first water guide 74 and the height H2 of the second water guide 76, or may be smaller than these heights H1, H2. That is, as long as the fuel exhaust gas separation wall 78 faces the opening 62a of the fuel exhaust gas inlet 62, the height H3 of the fuel exhaust gas separation wall 78 can be determined freely. The height H1 of the first water guide 74 and the height H2 of the second water guide 76 may be different from each other. The outlet port 66a may be formed at any position of the separation surface 68a.

The fuel cell system according to the present invention is not limited to the above described embodiment. It is a matter of course that various structures may be adopted without departing from the gist of the present invention.

What is claimed is:

1. A fuel cell system comprising:
   a fuel cell configured to generate electricity by an electrochemical reaction of a fuel gas and an oxygen-containing gas;
   an oxygen-containing gas inlet channel configured to guide the oxygen-containing gas to the fuel cell;
   a humidifier provided in the oxygen-containing gas inlet channel;
   a gas liquid separator provided downstream of the humidifier in the oxygen-containing gas inlet channel; and
   a fuel exhaust gas inlet channel configured to guide a fuel exhaust gas containing liquid water discharged from the fuel cell to the gas liquid separator,
   wherein the gas liquid separator is configured to perform gas liquid separation of both of the oxygen-containing gas humidified by the humidifier and the fuel exhaust gas containing the liquid water guided from the fuel exhaust gas inlet channel.

2. The fuel cell system according to claim 1, wherein the gas liquid separator includes a separator body including a proximal part having a separation surface extending in a substantially vertical direction; and
   the separator body has an oxygen-containing gas inlet port configured to supply the oxygen-containing gas humidified by the humidifier into the separator body, in a manner that the oxygen-containing gas inlet port faces the separation surface.

3. The fuel cell system according to claim 2, wherein the separator body includes a circumferential wall protruding from the proximal part in a manner to surround the separation surface;
the circumferential wall has a fuel exhaust gas inlet to supply the fuel exhaust gas containing liquid water guided from the fuel exhaust gas inlet channel, into the separator body; and
the separator body includes a fuel exhaust gas separation wall that faces an opening of the fuel exhaust gas inlet.

4. The fuel cell system according to claim 3, wherein the fuel exhaust gas inlet is provided in the separator body in a manner that the fuel exhaust gas containing the liquid water is discharged upward.

5. The fuel cell system according to claim 3, wherein the separation surface comprises:
a first water guide configured to guide liquid water attached to an inner surface of the circumferential wall downward; and
a second water guide configured to collect liquid water attached to the separation surface, and guide the liquid water downward.

6. The fuel cell system according to claim 5, wherein the circumferential wall includes an inner surface extending in an annular shape;
the first water guide includes a plurality of outer water guide plates that face an inner surface of the circumferential wall through a gap and that extend in a circumferential direction of the circumferential wall in a manner that a water guide channel is formed between the plurality of outer water guide plates and the inner surface of the circumferential wall; and
the plurality of outer water guide plates are provided with gaps between each other in the circumferential direction of the circumferential wall.

7. The fuel cell system according to claim 6, wherein the second water guide includes a plurality of inner water guide plates provided inside the plurality of outer water guide plates.

8. The fuel cell system according to claim 6, wherein the separation surface has an outlet port configured to discharge the oxygen-containing gas and the fuel exhaust gas after separation of liquid water; and
the plurality of outer water guide plates are provided in a manner that at least parts of the plurality of outer water guide plates cover the outlet port from above.

9. The fuel cell system according to claim 8, wherein the second water guide includes an annular water guide plate protruding from a marginal portion of the outlet port toward a position where the oxygen-containing gas inlet port is present.

10. The fuel cell system according to claim 9, wherein an R surface is provided in an inner marginal portion of a protruding end of the annular water guide plate.

11. The fuel cell system according to claim 5, wherein a height of the fuel exhaust gas separation wall from the separation surface is larger than heights of the first water guide and the second water guide from the separation surface.

12. The fuel cell system according to claim 3, wherein the fuel exhaust gas separation wall includes:
a separation wall body facing an opening of the fuel exhaust gas inlet; and
a protrusion protruding downward from the separator body.

13. The fuel cell system according to claim 2, wherein the separator body comprises a water drainage part configured to discharge separated liquid water to the outside.

14. The fuel cell system according to claim 1, wherein the gas liquid separator is provided integrally with the humidifier.

15. The fuel cell system according to claim 4, wherein an upper end of the fuel exhaust gas inlet protrudes into the separator body.

16. The fuel cell system according to claim 8, wherein the outlet port is positioned above the fuel exhaust gas separation wall.

17. The fuel cell system according to claim 5, wherein a height of the first water guide from the separation surface and a height of the second water guide from the separation surface are the same.

* * * * *